(12) United States Patent
Gingras

(10) Patent No.: US 11,208,763 B2
(45) Date of Patent: Dec. 28, 2021

(54) SUPPORTED TOOTHED PLATES IN A DISPERSER

(71) Applicant: Andritz Inc., Alpharetta, GA (US)

(72) Inventor: Luc Gingras, Harrogate (GB)

(73) Assignee: ANDRITZ INC., Alpharetta, GA (US)

( * ) Notice: Subject to any disclaimer, the term of this patent is extended or adjusted under 35 U.S.C. 154(b) by 63 days.

(21) Appl. No.: 16/656,721

(22) Filed: Oct. 18, 2019

(65) Prior Publication Data

US 2020/0131703 A1 Apr. 30, 2020

Related U.S. Application Data

(60) Provisional application No. 62/844,570, filed on May 7, 2019, provisional application No. 62/752,077, filed on Oct. 29, 2018.

(51) Int. Cl.
*D21C 5/02* (2006.01)

(52) U.S. Cl.
CPC .................... *D21C 5/025* (2013.01)

(58) Field of Classification Search
CPC .......... B02C 7/12; D21D 1/008; D21D 1/306; D21D 5/025; D21B 1/32; D21B 1/345
See application file for complete search history.

(56) References Cited

U.S. PATENT DOCUMENTS

| 4,641,438 A * | 2/1987 | Laird | .............. | A43B 13/223 |
| | | | | 36/32 R |
| 2010/0269991 A1* | 10/2010 | Antensteiner | .......... | D21D 1/008 |
| | | | | 162/55 |

FOREIGN PATENT DOCUMENTS

| DE | 102009047659 A1 * | 6/2011 | .......... B01F 7/00766 |
| DE | 102011005273 A1 | 9/2012 | |
| DE | 202014010374 U1 | 6/2015 | |
| DE | 102015212012 A1 | 12/2016 | |
| EP | 2683870 B1 | 5/2016 | |
| WO | 2017001359 A1 | 5/2017 | |

OTHER PUBLICATIONS

English translation of DE 10 2009 047 659 A1 supplied by Espacenet (Year: 2009).*
EP Application No. 19 205 566.3, "Communication under Rule 71(3) EPC—Intention to Grant a Patent", dated Sep. 29, 2020, 6 pages.
Pregetter, Mario, European Search Report, Munich, Germany, dated Apr. 22, 2020.
Pregetter, Mario, European Search Report and Written Opinion, dated Mar. 2, 2020.
TW Application No. 108138915, Office Action dated Dec. 1, 2020, 6 pages with English translation.
European Application No. EP19205566.3, Notice of Decision to Grant dated Feb. 4, 2021, 2 pages.

* cited by examiner

*Primary Examiner* — Eric Hug
*Assistant Examiner* — Elisa H Vera
(74) *Attorney, Agent, or Firm* — Kilpatrick Townsend & Stockton LLP

(57) ABSTRACT

Dispersers and disperser plate segments configured to be mounted in dispersers, wherein the disperser plate segments comprise rows of teeth and wherein bridges span gaps between adjacent teeth in at least one of the rows of teeth, wherein the bridges are separated from a substrate of the front face by an open space in the gap. In other exemplary embodiments, a buttress extends from at least one face of the tooth to support the tooth.

12 Claims, 7 Drawing Sheets

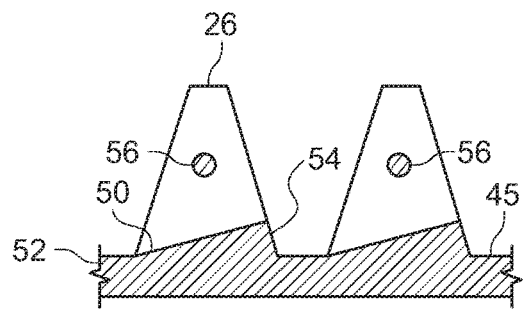
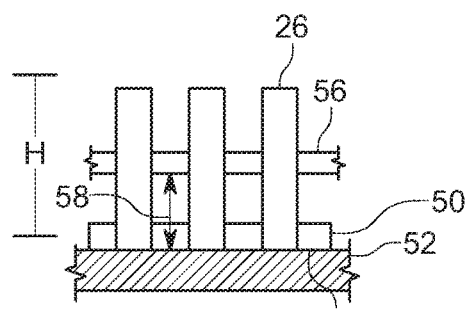
FIG. 4A  FIG. 4B
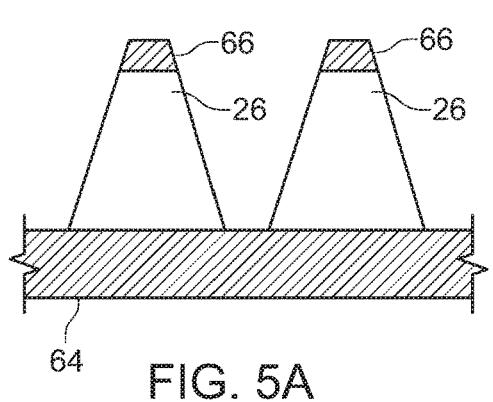
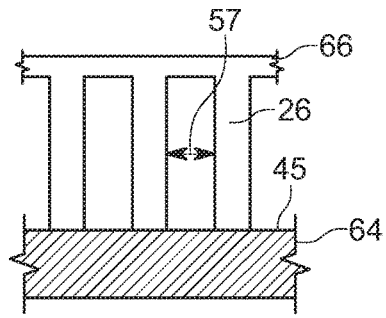
FIG. 5A  FIG. 5B
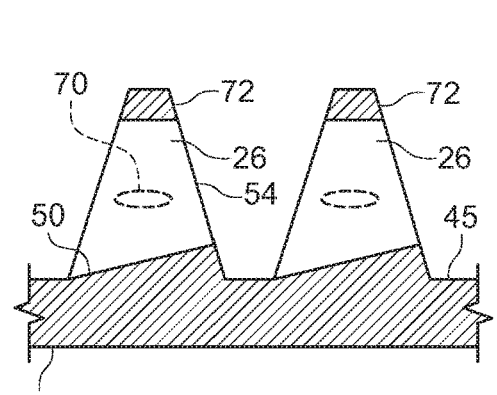
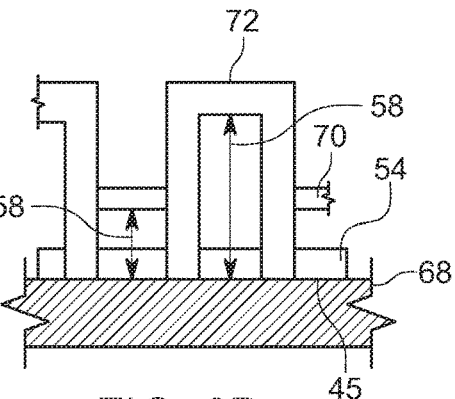
FIG. 6A  FIG. 6B
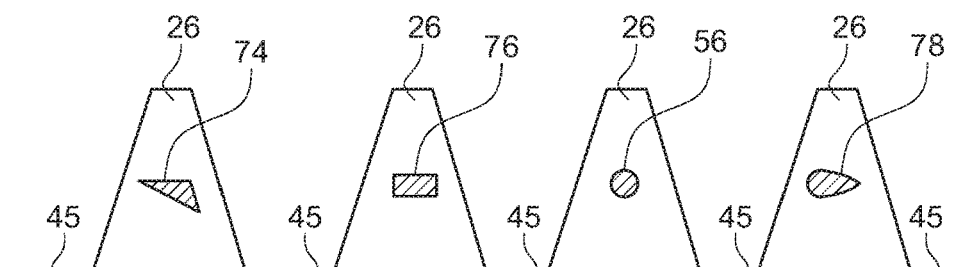
FIG. 7A  FIG. 7B  FIG. 7C  FIG. 7D

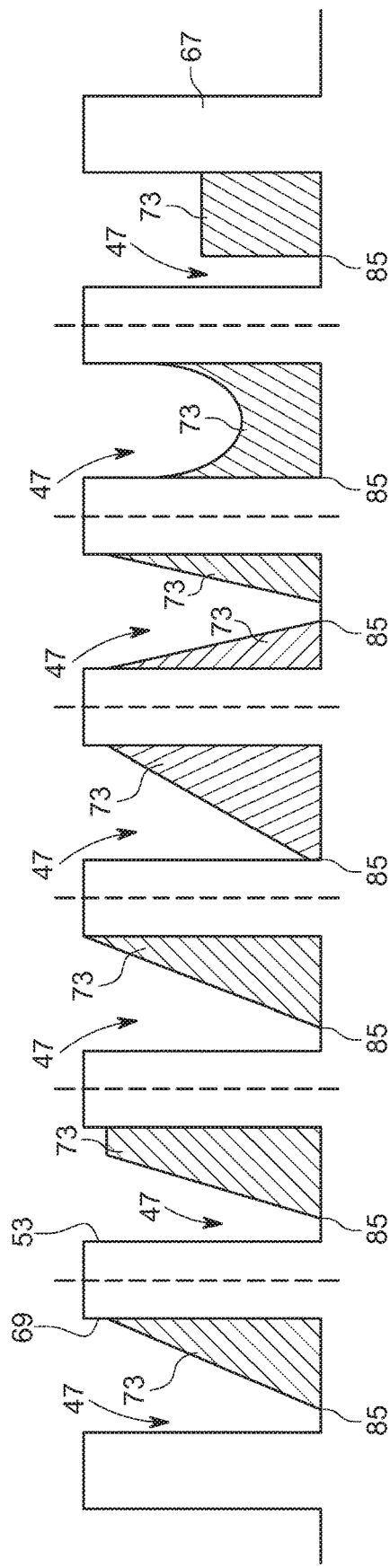
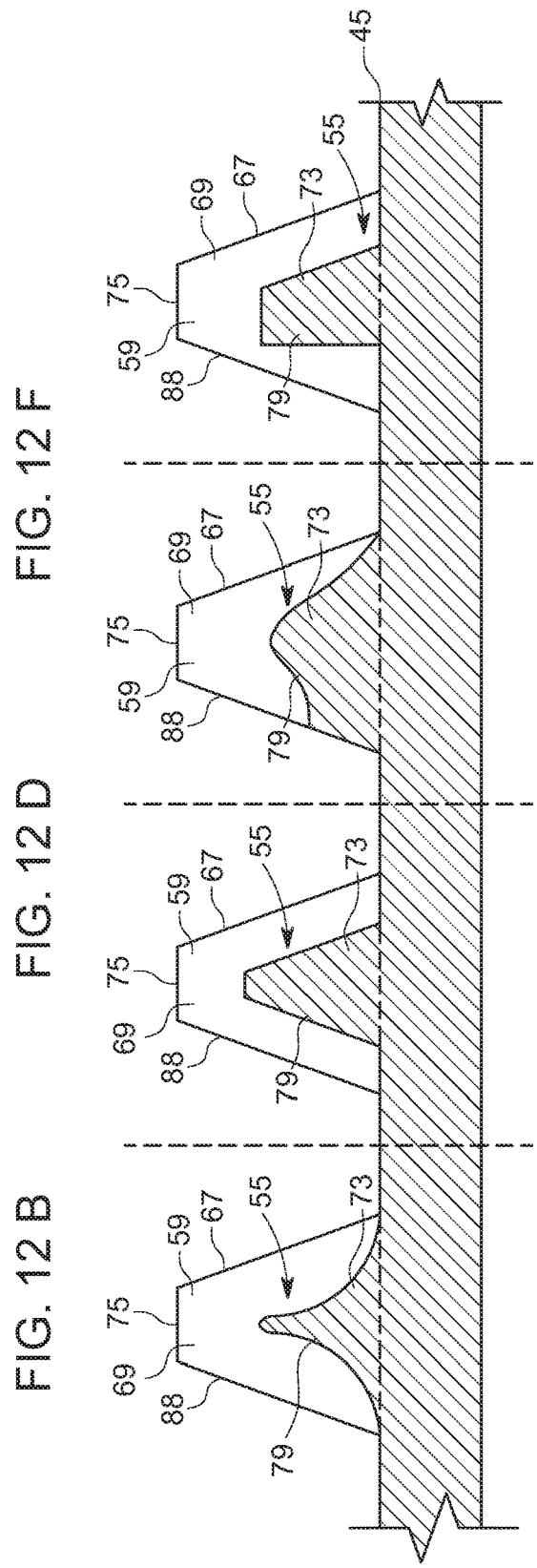

SUPPORTED TOOTHED PLATES IN A DISPERSER

CROSS-RELATED APPLICATION

This application claims the benefit of each of the following U.S. Provisional Patent applications, each of which is incorporated herein by reference in its entirety: U.S. Provisional Patent Application No. 62/752,077 filed on Oct. 29, 2018 and U.S. Provisional Patent Application No. 66/844,570 filed on May 7, 2019.

BACKGROUND OF THE INVENTION

1. Technical Field

This disclosure relates to disperser machines for processing recovered pulp fibers from recycled paper and packaging material, and other material separation machines with opposing discs and intermeshing teeth.

2. Related Art

A disperser is a machine used for recycling paper and packaging material. Operators first pulp recycled paper and packaging material to separate the fibers in the material. The operators then feed the pulped fibers through the disperser typically at a high consistency, such as between 20-40% dry contents. Dispersers remove ink, toner, and other "stickies" from the fibers in paper and packaging material. Dispersers also reduce the particulate size of ink, toner and stickies, so that they are not so clearly visible in the final product pulp.

Each disc typically includes an assembly of annular sector-shaped plate segments arranged in a circular array and mounted on a support disc. The assembly of plate segments is referred to as a plate. The front surface of each plate segment, which faces the front surface of the opposing plate segments, typically includes teeth, also referred to as pyramids, arranged in rows across the plate segment. The rows of teeth typically form an arc across the plate segment. The arced rows of teeth on one plate intermesh with the rows of teeth on an opposing plate. That is, arced rows of teeth on one plate segment rotate freely between arced rows of teeth disposed on the opposite plate segment. Examples of discs for dispersers are shown in U.S. Pat. Nos. 9,145,641; 7,766,269; 7,478,773; 7,472,855; 7,300,008 and 7,172,148; U.S. Pat. App. Pub. Nos. 2014/017.4688, and European Patent Application 2,683,870 B1.

Recycled paper and packaging materials typically include many contaminants, including abrasive particles such as large and hard particles. These abrasive particles wear the disperser teeth, which in turn limits the useful life of the plates.

To address the problem of contaminants, it is known to form plates for the discs of a disperser from hard-wear alloys which are resistant to wear from abrasive particles. However, hard-wear alloys are brittle. Because of the brittleness, the teeth on the plates may break when impacted by larger hard particles, which contaminate the pulped material. Broken teeth limit the life of the plates and can cause other damage further down the process line.

To address the brittleness, wide and short teeth have been used on plate segments formed of hard-wearing alloys. In contrast, plate segments with tall teeth are usually made in softer and breakage-resistant alloys that limit the useful lifetime of the plates. Wide and short teeth are more resistant to breakage, but are not suited for higher energy input applications because the wide and short teeth form fewer rows with fewer teeth compared to rows with narrow teeth and thus have fewer intermeshing teeth edges on each row. The shorter teeth reduce the lengths of crossing edges of opposing teeth, which likewise reduces the action on the pulped fibers. Also, the short, wide teeth reduce the gap between the opposing discs and thereby reduces throughput capacity of material flowing through the disperser.

Also, dams and ramps on the substrate of the front face of the discs and between adjacent teeth have been used to support the teeth to reduce breakages of the teeth. Dams and ramps to address difficulties with brittle teeth formed of hard wear alloy tend to be relatively large. Large dams and ramps can affect the homogeneity of the fiber material moving between the opposing discs in an undesired manner. Large ramps and especially large dams will also reduce the throughput capacity of disperser plates.

SUMMARY OF THE INVENTION

There is a need for a new plate segment design that allows for rows of tall, narrow teeth to be formed of hard-wearing alloys and which are resistant to tooth breakage.

A plate segment is disclosed herein that has bridges between adjacent teeth in a row. The bridges support the teeth to allow the teeth to be tall and narrow.

A novel design of plates featuring intermeshing teeth has been developed. The teeth are reinforced by being connected to each other by bridges at or near the top of the teeth and/or at a height intermediate between the top and the bottom of the teeth.

It is believed that the bridges will not add significant restrictions to the flow of pulped fiber through the gap between the plates, at least as compared to plates with large ramps and dams. Further, the bridges between the teeth allow for a homogeneous distribution of fiber material moving between the plates. Furthermore, the location and shape of the connections can be optimized for flow capacity and maximum strength of the teeth, thus provide toothed plates with good performance and low risk of breakage of teeth.

The invention may be embodied as a plate segment for a disperser or other material separation machine comprising: a substrate having a front side and a back side, wherein the back side is configured to be mounted to a support disc; rows of teeth protruding from the front side of the metal substrate, wherein each of the rows are arranged along an arc extending from one side of the plate segment to an opposite side of the plate segment; in at least one of the rows of teeth, adjacent teeth are joined by a bridge spanning a gap between the adjacent teeth in a row, wherein the bridge is elevated above the front side of the substrate such that the bridge is separated from the front side by an open space in the gap. The bridges may span all adjacent teeth in a row or bridges may only span selected pairs of teeth in a row.

The bridge may be an end of the adjacent teeth away from the front side of the substrate. The bridge may join a sidewall of each of the adjacent teeth. The bridge may join the sidewalls of the adjacent teeth at an elevation of the teeth above the front side in a range of one-third to two-thirds a height of the adjacent teeth above the front side.

The bridges may be positioned at various elevations above the substrate and along the height of the teeth such that there is a clearance between the bridge and the substrate. For example, bridges may be at an elevation above the substrate of the plate segment that is three-quarters (¾) or more the height of the teeth. In particular, the bridges may be at or near the top of the teeth.

The bridges may have a circular shape in cross section at a mid-point of the bridge between the adjacent teeth. Alternatively, the bridge may have other cross sectional shapes such as a rectangular shape; a tapered shape or a tear drop shape. Or any other shape that allows the function of the bridge to be performed.

There may be a bridge between some or each of the adjacent teeth in one or more of the rows, and no bridges in other rows on a plate segment. The bridges may be in the radially outermost row(s) and radially inner rows may lack bridges.

The bridges in a row may include a first bridge between a first pair of adjacent teeth in the row and a second bridge between a second pair of adjacent teeth in the row, wherein the first bridge is at or near a top of the first pair of adjacent teeth and the second bridge is at a lower elevation between the second pair of adjacent teeth such as in a range between one third and eighty percent (80%) the height of the second pair of adjacent teeth. In a row of teeth, there may be alternating first and second bridges between each successive pairs of teeth.

Further there may be two or more bridges between a pair of adjacent teeth on a plate segment. For example, one of the bridges may be at or near the top of the teeth and a second bridge may be between one-third and two-thirds the height of the teeth. A third and further bridges can be at the same height as other bridges, or at a new height. Clearances are between both bridges and the substrate of plate segment, and between the bridges.

The invention may be embodied as a disperser comprising: a housing including an inlet configured to receive a stream including cellulosic fibrous material; opposing discs mounted in the housing such that at least one of the discs rotates about a rotational axis within the housing; each of the opposing discs has a front face and the front faces on the opposing discs face each other and are separated by gap between the opposing discs; each of the opposing discs has rows of teeth on the front face for the discs, wherein teeth in each row of teeth are at a common radius from the rotational axis; bridges span gaps between adjacent teeth in at least one of the rows of teeth, wherein the bridges are separated from a substrate of the front face by an open space in the gap; wherein the rows of teeth on the front face of a first of the opposing discs are at different radii than the rows of teeth on the front face of a second of the opposing discs; and wherein the rows of the first opposing disc intermesh with the rows of teeth on the second opposing discs.

In other exemplary embodiments, the plate segments may comprise buttresses extending from a face of a tooth to the substrate of the disperser segment.

Without being bound by theory, it is contemplated that the exemplary buttresses disclosed herein, may permit manufactures to include a greater number of taller teeth on the disperser plate segment, thereby increasing the work that the disperser plate segments can impart to the recycled fiber per unit of area.

BRIEF DESCRIPTION OF THE DRAWINGS

The foregoing will be apparent from the following more particular description of exemplary embodiments of the disclosure, as illustrated in the accompanying drawings. The drawings are not necessarily to scale, with emphasis instead being placed upon illustrating the disclosed embodiments.

FIGS. 3(A) and 4(B) are side and front views of a portion of a plate segment showing teeth with conventional dams.

FIGS. 4(A) and 4(B) are side and front views, respectively, of a portion of a plate segment having teeth with connecting bridges.

FIGS. 5(A) and 5(B) are side and front views, respectively, of a portion of another plate segment having teeth with connecting bridges.

FIGS. 6(A) and 6(B) are side and front views, respectively, of another plate segment with teeth with connecting bridges.

FIGS. 7(A), 7(B), 7(C) and 7(D) are side views of teeth on plate segments showing bridges having different cross sectional shapes.

FIGS. 12(A), 12(B), 12(C), 12(D), 12(E), 12(F), 12(G) are side views of exemplary disperser teeth showing exemplary buttresses extending from one or more faces of an exemplary disperser tooth.

FIGS. 13(A), 13(B), 13(C), and 13(D) are side views perpendicular to the views of FIG. 12. These figures show the abutting area of the buttress relative to the total area of the first tooth face.

DETAILED DESCRIPTION OF THE INVENTION

Figure 1:
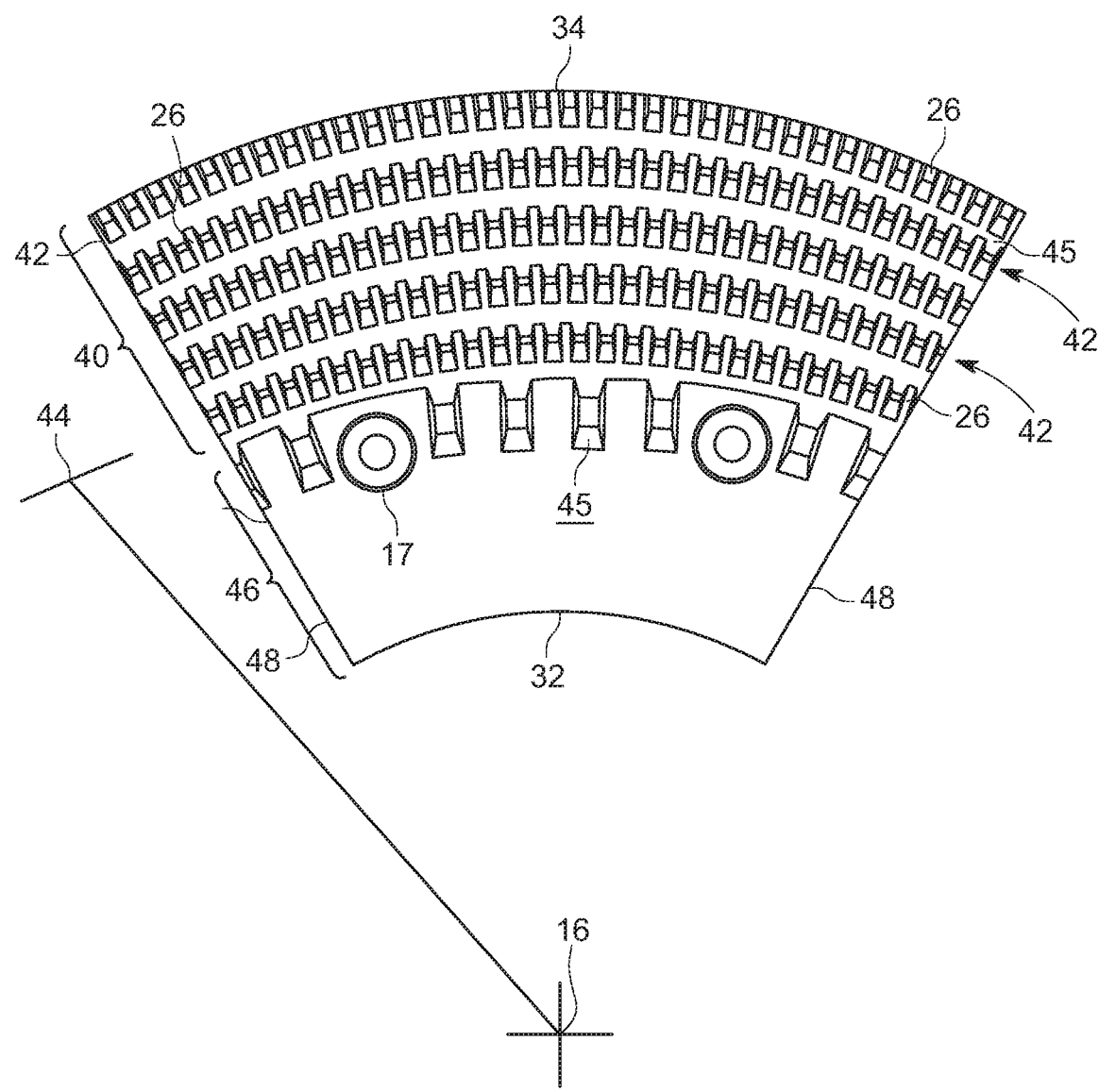
FIG. 1A is a front view of a conventional plate segment in a disc in a disperser.
FIG. 1B is a side view of a cross section of the plate segment shown in FIG. 1A.
FIG. 1C is a side view of a cross section of a portion of a disperser in which is mounted a rotor disc and stator disc.

The following detailed description of the preferred embodiments is presented only for illustrative and descriptive purposes and is not intended to be exhaustive or to limit the scope and spirit of the invention. The embodiments were selected and described to best explain the principles of the invention and its practical application. One of ordinary skill in the art will recognize that many variations can be made to the invention disclosed in this specification without departing from the scope and spirit of the invention.

Similar reference characters indicate corresponding parts throughout the several views unless otherwise stated. Although the drawings represent embodiments of various features and components according to the present disclosure, the drawings are not necessarily to scale and certain features may be exaggerated in order to better illustrate embodiments of the present disclosure, and such exemplifications are not to be construed as limiting the scope of the present disclosure.

Except as otherwise expressly stated herein, the following rules of interpretation apply to this specification: (a) all words used herein shall be construed to be of such gender or number (singular or plural) as to circumstances require; (b) the singular terms "a," "an," and "the," as used in the specification and the appended claims include plural references unless the context clearly dictates otherwise; (c) the antecedent term "about" applied to a recited range or value denotes an approximation within the deviation in the range or values known or expected in the art from the measurements; (d) the words "herein," "hereby," "hereto," "hereinbefore," and "hereinafter," and words of similar import, refer to this specification in its entirety and not to any particular paragraph, claim, or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms, "comprising," "having," "including," and "containing" are to be construed as open-ended terms (i.e., meaning "including but not limited to").

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

To the extent necessary to provide descriptive support, the subject matter and/or text of the appended claims is incorporated herein by reference in their entirety.

Recitation of ranges of values herein are merely intended to serve as a shorthand method of referring individually to each separate value falling within the range of within any sub ranges there between, unless otherwise clearly indicated herein. Each separate value within a recited range is incorporated into the specification or claims as if each separate value were individually recited herein. Where a specific range of values is provided, it is understood that each intervening value, to the tenth or less of the unit of the lower limit between the upper and lower limit of that range and any other stated or intervening value in that stated range or sub range hereof, is included herein unless the context clearly dictates otherwise. All subranges are also included. The upper and lower limits of these smaller ranges are also included therein, subject to any specifically and expressly excluded limit in the stated range.

It should be noted that some of the terms used herein are relative terms. For example, the terms "upper" and "lower" are relative to each other in location, i.e. an upper component is located at a higher elevation than a lower component in a given orientation, but these terms can change if the device is flipped. The terms "inlet" and "outlet" are relative to a fluid flowing through them with respect to a given structure, e.g. a fluid flows through the inlet into the structure and flows through the outlet out of the structure. The terms "upstream" and "downstream" are relative to the direction in which a fluid flows through various components, i.e. the flow of fluids through an upstream component prior to flowing through the downstream component.

The terms "horizontal" and "vertical" are used to indicate direction relative to an absolute reference, i.e. ground level. However, these terms should not be construed to require structure to be absolutely parallel or absolutely perpendicular to each other. For example, a first vertical structure and a second vertical structure are not necessarily parallel to each other. The terms "top" and "bottom" or "base" are used to refer to locations/surfaces where the top is always higher than the bottom/base relative to an absolute reference, i.e. the surface of the Earth. The terms "upwards" and "downwards" are also relative to an absolute reference; an upwards flow is always against the gravity of the Earth.

Figure 1C:
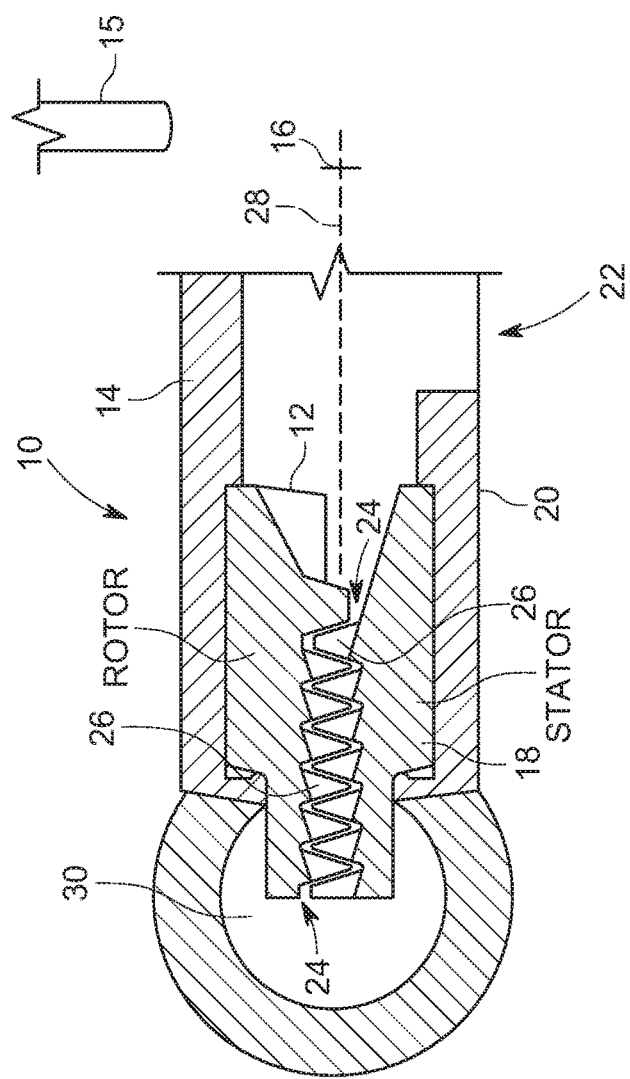
Figure 1B:
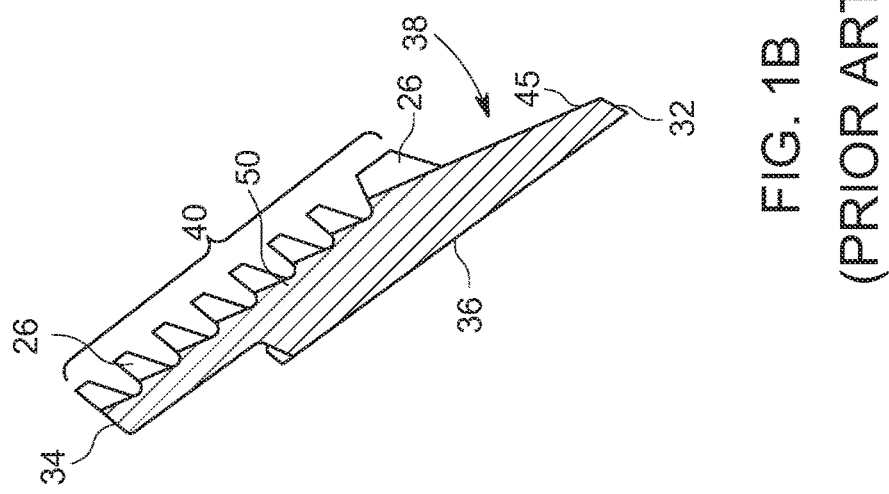
Figure 2A:
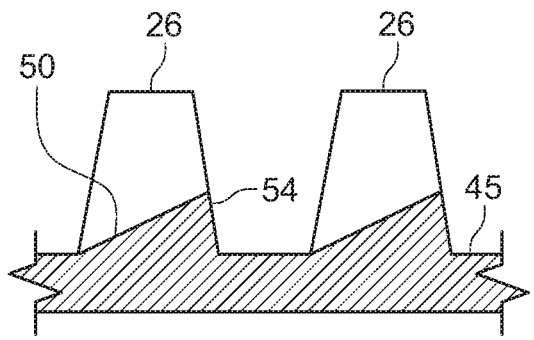
FIGS. 2(A) and 2(B) are side and front views of a portion of a plate segment showing teeth with conventional high ramps.
Figure 2B:
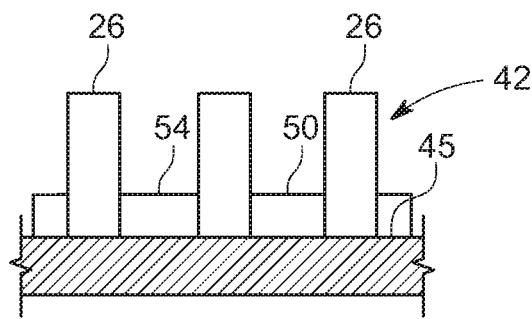
Figure 3A:
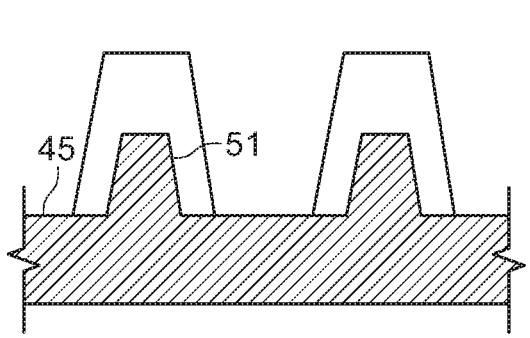
Figure 3B:
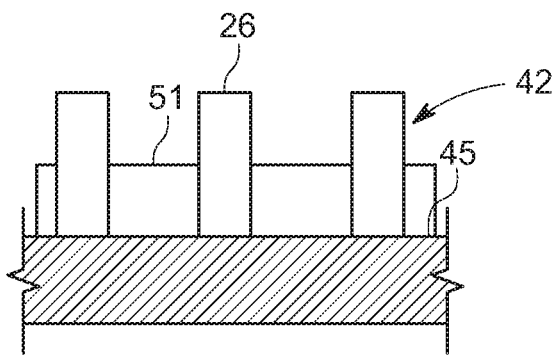

Dispersers typically come in one of three varieties: disc, conical, and cylindrical. Although this detailed description primarily describes disc dispersers, conical and cylindrical dispersers typically function in a similar way. Instead of opposing discs, they feature nesting truncated cones and nested cylinders respectively. The exemplary plate segments described herein may be manufactured to work with conical or cylindrical dispersers, and such plate segments and types of dispersers are considered to be within the scope of this disclosure. FIGS. 1A, 1B and 1C show a disperser 10 (FIG. 1C) which houses rotor plate segments 12 mounted in an annular array to a rotor support disc 14. The rotor plate segments 12 and support disc 14 are rotated about a center axis 16 of the disperser. The rotor plate segments 12 and disc 14 are turned by a shaft 15 drive by a drive motor (not shown). The disperser also houses stator plate segments 18 mounted in an annular array to a stator support disc 20, which is fixed to the housing of the disperser.

A center inlet 22 to the stator support disc 20 receives material to be processed between the rotor and stator plate segments. The material may be pulp recovered by recycling paper or packaging material. The material moves into a gap 24 between the front faces of the rotor plate segments 12 and the front faces of the stator plate segments 18. The rotation of the rotor plate segments (and stator plate segments if they are configured to turn) creates centrifugal forces that propel the material through the gap 24. As the material moves through the gap 24, the material flows between and over teeth 26 arranged in rows on the front faces of each of the rotor plate segments 14 and the stator plate segments 18.

The rows of teeth 26 on the rotor plate segments 12 intermesh with the rows of teeth on the stator plate segments 18. To provide for intermeshing, the rows of teeth on the rotor plate segments 12 are at different radii from the center axis 16 than are the rows of teeth on the stator plate segments 18. The rows of teeth each extend through a plane 28 extending through the center axis 16 and radially outward through the gap 24.

As the material passes through the gap 30, the teeth on the rotor and stator plate segments 12, 18 impact the material and dislodges from the pulp fibers particles of ink, toner and stickies from the fibers of the pulp. Dislodging these particles from the fibers is desired. As the material exits the gap in a radial direction, the material enters an annular chamber 30 of the housing of the disperser 10. The material moves through the chamber to a discharge outlet. After discharge, the material if further processed to separate the dislodged particles from the pulp fibers.

Plate segments 12, 18 may be, for example, individual annular sector-shaped components or a region of an annular plate. Plate segments that are individual annular sector-shaped components are arranged in an annular array to form a full plate. The plate segments/plate are mounted on a support disc 14, 20. An annular array of rotor plate segments 14 are mounted to the rotor disc support 12, and annular array of stator plate segment 18 are mounted to the stator support disc 13. The plate segments may be fastened to the disc by any convenient or conventional manner, such as by bolts (not shown) passing through bores 17. The plate segments 12, 18 are arranged side-by-side to form the annular array as they are mounted to each disc support.

The rotor or stator plate may or may not be formed of separate component plate segments. Rather, the plate segments may be joined as a single-piece plate. While plate segments that are separate components are disclosed here, the invention may be embodied in an annular plate in which the plate segments are integrated into a single piece plate.

A plate segment 12, 18 has an inner edge 32 towards the center axis 18 of its attached disc support and an outer edge 34 near the periphery of the disc support. Each plate segment 12, 18, has a front face with a substrate 45 and, protruding from the substrate 45, concentric rows 42 of teeth 26. The rotation of the rotor disc support 14 and its plate segments 12 apply a centrifugal force to the refined material, e.g., fibers, that cause the material to move through the gap 24 between the discs in a radially outward direction from the inner edges 32 to the outer edges 34 of the plate segments. The pulped material predominantly move between adjacent teeth 26 in each row on the opposing discs. The pulped material flows radially out from the gap 24 at the outer periphery of the discs and into a casing 30 of the refiner 10.

The rows 26 of teeth on each disc are each at a common radial distance 44 from the disc center 16. The rows 26 on a disc are concentric. The rows one the opposing discs intermesh across the gap 24 such that the teeth 26 intersect the plane 28 in the gap 24 between the discs.

Fiber passing from the center inlet 22 of the stator disc, through the gap 24 and to the periphery of the discs receive impacts as the rotor teeth 26 pass close to the stator teeth 28. The clearance between the rotor teeth 28 and the stator teeth 28 may be in a range of 0.5 to 12 millimeters ("mm"). The clearance may be selected such that the fibers are severely and alternately flexed as they pass between the teeth in the rows of the rotor and stator discs. Flexing the fiber breaks the ink and toner particles on the fibers into smaller particles and breaks off the stickie particles on the fibers. The clearance should not be so small as to damage or break the fibers.

A rotor or stator plate segment 12, 18 is shown in more detail in FIGS. 1A and 1B than in FIG. 1C. The plate segment has an inner edge 32 and an outer edge 34. These edges may be arc-shaped, wherein each arc is centered on the center axis 16 when the plate segments are mounted to a disc and in the disperser 10. A back side 36 of the plate is configured to mount to a front surface of support disc 14, 20.

The front side 38 includes an outer arc-shaped section 40 on which rows 42 of teeth 28 are arranged. Each row 42 is arc-spaced and is at a constant radius 44 from the center axis 16 of the disperser. The teeth extend out from a substrate 45 of the plate segment. An inner section 46 of the front face may be the planar substrate 45 of the front of the plate segment.

The side edges 48 of the plate segment 12, 18 may be a straight edge aligned along a radius from the center axis 16. The side edges 48 are configured to be adjacent side edges of other plate segments mounted to the stator or rotor support disc. By arranging plate segments side-by-side on a support disc, the plate segments form an annular disc array on the support disc. Each of the rows 42 of teeth 26 on the plate segment are aligned along a common radius with a row of teeth on the other plate segments mounted to the support disc. Thus, the teeth from all of the plate segments mounted to a support disc are arranged in circular rows. These circular rows of teeth on rotor plate segments mounted to the rotor support disc intermesh with circular rows of teeth on stator plate segments mounted to the stator support disc in the disperser.

FIGS. 2(A), 2(B), 3(A), and 3(B) shown ramps 50 and dams 51 between adjacent teeth 26 in a row 42 of teeth in conventional plate segments. These conventional dams 50 and ramps 51 are large protrusions extending from the substrate 45 of the front face of the plate segment. Ramps 50 may protrude from the substrate by 2 to 6 mm or more in height. Dams 51 may extend above the substrate from a few millimeters to about three-quarters (¾) of the tooth height. The ramps or dams may alternate with bridges between teeth in a row. For example, there may be a series of two to six bridges between adjacent teeth followed by a ramp or dam between the next one to six teeth. Ramps, dams and bridges may also be combined in any variation in between adjacent teeth, such as a bridge and a ramp in the same area.

As is known in the art, ramps and dams strengthen the teeth to which they are attached. The height of the ramp or dam is selected to provide a desired level of support to the teeth. Ramps or dams that are relatively low as compared to the tooth height provide less support than do taller ramps or dams. Ramps or dams that are tall as compared to tooth height provide good support of the teeth but adversely affect the flow of pulped material through the teeth and can significantly reduce the production capacity of the disperser. Another adverse affect due to tall ramps or dams may be a reduction in the homogeneity of the pulped material by flowing the material in concentrated areas between the discs.

FIGS. 4(A) and 4(B) show teeth 26 on a plate segment 52 configured to be mounted to a rotor or a stator support disc. The teeth 26 are arranged in concentric rows 42. The teeth 26 in each row are connected by bridges 56 which span between and connect adjacent teeth. The bridges 56 provide structural support for the teeth and assist in preventing damage to the teeth by large, hard particles in the material moving between the teeth. The bridges 56 may span the slot 57 between adjacent teeth in a row. There may be bridges 56 between all adjacent teeth 26 and span all slots 57 in a row, as is shown in FIGS. 2 and 3. The bridges 56 may be integral with the teeth 26 such that the teeth and bridges are formed of the same material and as a single piece cast component. These materials may be hard wear alloys, such as alloys with nickel and chromium, and martensitic or austenitic stainless steels.

The bridges 56 may be included in all rows 42 of teeth on a plate segment. Alternatively, the bridges 56 may be in select ones of the rows and not part of other rows. For example, the bridges may be in the first few rows, such the first row, the first two rows, or the first three rows. The first rows are the radially inward rows. The first rows of teeth may be subjected to the largest particles in the material passing through the disperser. Also, the bridges may be useful in the radially outward rows 42 due to the higher centrifugal forces at the radially outward rows as compared to the radially inward rows. Thus, a plate segment may have rows 42 with bridges 56 on the radially outer row or outer few rows, such as the outer one to seven rows, and not on radially inward rows. In some applications, the radially inward rows tend to be wider and spaced apart to a greater extent the radially outer rows. Bridges may not be needed to support wide teeth. Further, bridges may not be suited to span wide gaps between teeth such as may exist in the radially inward mostrows.

The bridges 56 are elevated about the substrate 45 of the front face of the plate segment 12, 18. Because of the elevation, there is a clearance 58 between the bottom of the bridge and the surface of the substrate 45. The distance of the clearance 58 may be half of the height (H) of the teeth, one-third the height of the teeth, two-thirds the height of the teeth, eighty to ninety percent (80% to 90%) of the height, or substantially the entire height of the teeth. The distance of the clearance 58 is determined during the design of the plate segment. The distance of the clearance may be determined to improve the resistance of the teeth to breakage and to enhance the movement of the pulped material through the disperser. Staggering the position of bridges across different tooth spacing may allow a more uniform flow of fiber across and through rows of teeth. Also, staggering bridges on opposite sides of a tooth may provide enhanced strength to the tooth.

The bridges 56 may have a cross section that is circular, as is shown in FIGS. 2 and 3. The area of the cross section may be smaller than the area of a cross section of a tooth 26. For example, the area of the cross section of the bridge may be one-fifth, one-third, one-half or two-thirds the area of a cross section of a tooth at the same elevation from the substrate 45 as the bridge. The bridges 56 may be offset from the leading face 62 of the teeth and similarly offset from the trailing face 60 of the tooth, as shown in FIGS. 4(A) and 4(B). The bridges 56 may be centered on the sides of teeth along a radial direction, or they can be offset towards one of the edges.

The substrate may include a shallow ramp or dam 50 between adjacent teeth in a row of teeth. The ramp or dam 50 may be short, such as less than one-quarter the height of the teeth, to reduce the influence of the ramp or dam on the homogeneity of the pulped material. If there is a ramp, a ledge 54 may be formed at the trailing edge (radially outward) side of the row of teeth. The ramp or dam 50 provides further structural support for the teeth. The ramp or dam 50 may also assist in processing the recycled material by directing the material away from the substrate and towards the upper regions of the teeth.

FIGS. 5(A) and 5(B) show an exemplary plate segment 64 in which the bridges 66 from the top of the teeth 26. Each row 42 of teeth has a bridge 64 arranged in an arc matching the arc formed by the row. The bridge 66 forms the upper portion of the teeth in the row. The front face of the bridge 66 may be in the same plane as the leading face 62 of the teeth in the row and the trailing face 60 of the teeth. The upper surface of the bridge may be planer and generally parallel to portions of the substrate other than ramps or dams. Also, the thickness of the bridge 66 may be less than the width, where the thickness is in a direction perpendicular to a radial line and the thickness is parallel to the radial line.

FIGS. 6(A) and 6(B) show a plate segment 68 having rows of teeth 26 with a bridge in which segments 70, 72 of the bridge alternate between segments 70 at a middle height between adjacent teeth and segments 72 at the top of adjacent teeth. The height of the bridge segments is with respect to the substrate 45 of the plate segment. Because of the alternating heights, the clearance 58 between the substrate and the bridge segments also varies between adjacent pairs of teeth. The alternating segments continue for all teeth in each row 42. The alternating height teeth provide structural support for each tooth at both the top and middle of the tooth. Thus, the alternating heights may be used to provide increased structural strength to the teeth for plate segments expected to handle pulped material having large, hard particles or otherwise likely to have particles that could break teeth.

FIGS. 7(A), 7(B), 7(C), and 7(D) show exemplary bridges 74, 76, 56, and 78, between adjacent teeth 26 in different rows of plate segments. The bridges have different cross-sectional shapes. The bridge 74 has a triangular shape in cross section in which the apex of the triangle faces forward into the flow of pulped material flowing between stator and rotor discs. Orienting the apex to face the flow reduces the resistance to flow caused by the bridge. The bridge 76 has a rectangular shape in cross section. A rectangular cross sectional shape may provide more uniform structural support across the width of the tooth, where the width is from the leading face to the trailing face of the tooth. A circular cross sectional shape for a bridge 56 provides good structural support for teeth, relatively low flow resistance (as compared to a rectangular bridge) and may be resistant to damage to the bridge (as compared to bridges having other cross sectional shapes.). A bridge 78 having a teardrop shape with the thickest portion of the bridge facing forward provides good structural support for the forward portions of the teeth (where damage is most likely to occur) and low resistance to the flow of material. It will be understood that the disclosed shapes are exemplary shapes of bridges that fall within the scope of this disclosure and nothing herein limits the bridges to these particular shapes.

Figure 8A:
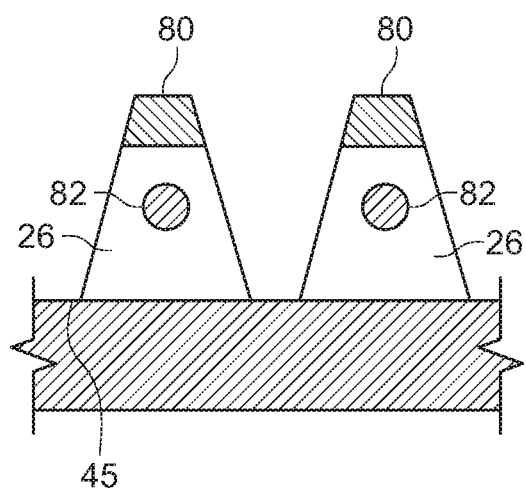
FIGS. 8(A) and 8(B) are side and front views of teeth on a plate segments showing pairs of bridges between adjacent teeth.
Figure 8B:
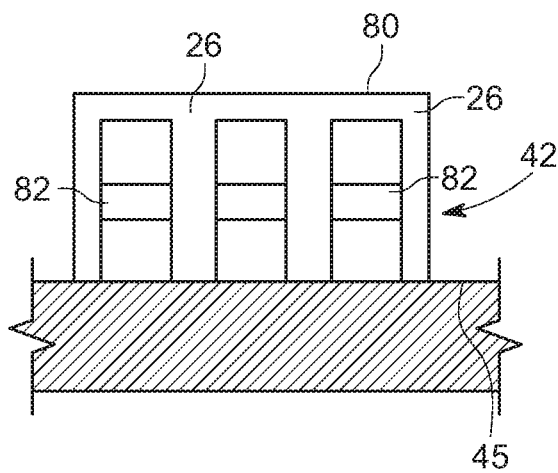

FIGS. 8(A) and 8(B) show front and side views of teeth 26 having a pair of bridges 80, 82. The upper bridge 80 may be within eighty to ninety percent (80% to 90%) of the height of the teeth 26. The lower bridge 82 may be at an elevation above the substrate 45 of one-third to two-third the height of the teeth. Alternatively, the pair of bridges 80, 82 may be at the same elevation above the substrate, with one bridge 80 in front of the other bridge 82 along a direction of the flow of material through the teeth (which direction is parallel to the substrate 45).

The bridges may be applied to different plate segments such that all of the rows in a plate segment have bridges with the same cross-sectional shape. Alternatively, the bridges in one row of teeth on a plate segment may have a different shape in cross section than other rows.

The bridges provide structural support for teeth on a plate segment or entire plate for a disperser. Because of the structural support provided by the bridges, the teeth are more resistance to breakage due to hard, large particles in the recycled pulp material being processed by the disperser. Because of the structural support provided by the bridges, the teeth may be taller and/or narrower than would be possible without bridges. Narrower teeth allow for an increase in the number of teeth in a row.

The plate segments with bridges between teeth may be formed by casting of metal, such as high wear metal alloys. To cast the plate segments, a mold may be formed from sand. The sand mold may be formed by investment casting, three-dimensional printing, or other additive manufacturing techniques. Sand cores may be needed to form portions of the plate segments. The sand mold is sacrificed in forming the plate segment. Alternatively, the plate segment may be formed directly with three-dimensional printing or other additive manufacturing techniques. Further, bridges may be added to an existing plate segment, such as by welding the bridges between teeth or wedging wooden pegs—for example—to create bridges.

Plate segments with bridges between teeth in one or more rows of teeth may be applied to machines other than dispersers. These machines include opposing discs with rows of intermeshing teeth and are used to separate particles from fibers being processed by the machine, separate lumps of fibers, or reduce size and homogenize feed particles.

Figure 9:
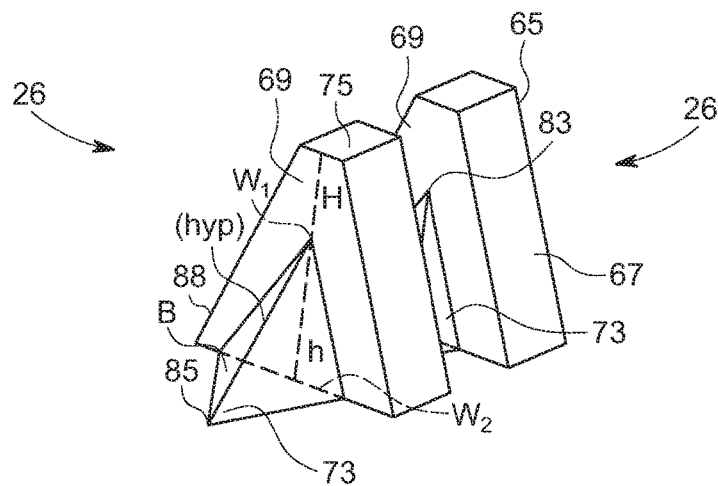
FIG. 9 is a perspective view of two adjacent exemplary disperser teeth having a buttress extending from a first tooth side of each of the depicted disperser teeth.
Figure 10:
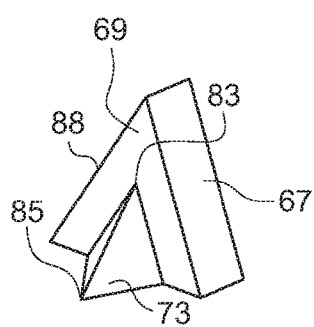
FIGS. 10(A) and 10(B) show a perspective view of an exemplary disperser tooth showing a pyramidal-shaped buttresses.
Figure 10:
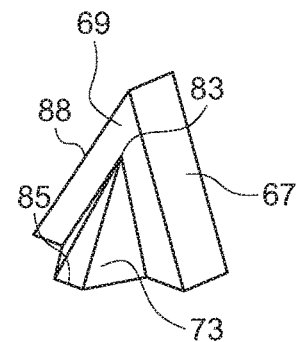
Figure 11:
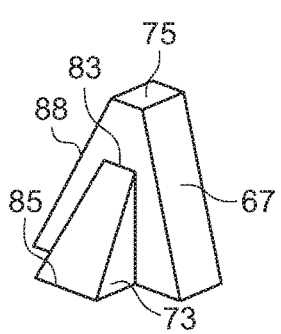
FIGS. 11(A), 11(B), 11(C), and 11(D) are perspective views of an exemplary disperser tooth showing different shapes of buttresses wherein the abutting area of the buttress is less than the total are of the tooth face to which the buttress abuts.
Figure 11:
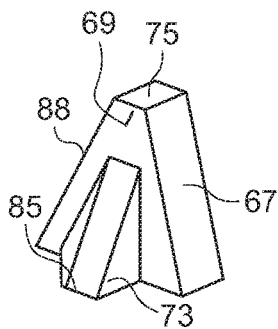
Figure 11:
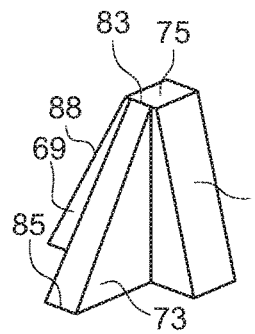
Figure 11:
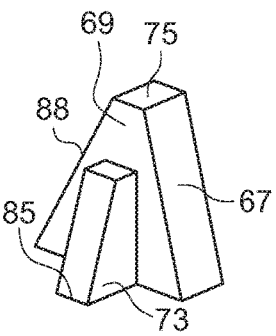

FIG. 9 is a perspective view of two adjacent exemplary disperser teeth 26 having a buttress 73 extending from a first tooth face 69 of each of the depicted disperser teeth 26. The area 79 (FIG. 13(A)-(D)) of the buttress 73 that abuts the first tooth face 69 (i.e. the "abutting area") is less than the total area 55 (FIG. 13(A)-(D)) of the first tooth face 69. In certain exemplary embodiments, the exposed area 59 (FIG. 13(A)-(D)) is between about 20% and 80% of the first tooth face's total area 55. It will be understood that the first tooth face's total area 55 is the sum of the buttress area 79 and the first tooth face's exposed area 59.

The tooth 26 further comprises a second tooth face 53 (FIG. 12(B)) and a body 65 bounded by the first tooth face 69, the second tooth face 53, a first lateral tooth side 67, and a second lateral tooth side 88 (FIG. 13(A)). Without being bound by theory, Applicant believes that the exemplary buttresses 73 described herein provide additional support to the disperser teeth 26, while still permitting sufficient open area 47 (FIG. 12(A)-(G)) between adjacent disperser teeth 26 to allow recycled material to flow through the open area 47 to maintain sufficient throughput.

The buttress 73 of FIG. 9 has a buttress height (h). In the depicted embodiment, the buttress height (h) is less than the tooth height (H), thereby exposing the first tooth face 69. In this depiction, the first tooth face 69 starts as the trailing face of the tooth 26 when the disperser is rotating. Without being bound by theory, it is believed that a majority of dispersion occurs due to the flexing of the recycled fibers between edges of intermeshing teeth 26 on opposite disperser plates. The exposure of the first face 69 allows operators to reverse the rotation of the disperser plates when the leading face (see the second face 53) becomes worn. In this manner, the disclosed embodiment may allow operators to extend the useful life of the disperser plate segments.

In certain exemplary embodiments, the buttress 73 is disposed on the second tooth face 53. In still other exemplary embodiments, a buttress can be disposed on both the first tooth face 69 and the second tooth face 53. Manufactures can place and configure the buttresses 73 according to the desired use of the disperser.

Without being bound by theory, it is further contemplated that the use of buttresses 73 such as the exemplary buttresses 73 disclosed herein, permit manufactures to include a greater number of taller teeth 26 on the substrate 45 of the disperser plate segment, thereby increasing the work that the disperser plate segments can impart to the recycled fiber per unit of area. In certain exemplary embodiments, the disperser teeth 26 comprise a flat top 75. In other exemplary embodiments, the top may be pointed.

The buttress 73 further comprises a distal bottom edge 85, a top edge 83, and a hypotenuse (hyp) extending form the top edge 83 to the distal bottom edge 85. In certain exemplary embodiments, the widest width (w2) of the base (B) of the buttress 73 is wider than the width (w1) at the top edge 83 of the buttress 73.

FIGS. 10-13 illustrate that the buttress 73 may have any number of shapes provided that the abutting area 79 of the buttress 73 is less than the total area 55 of the tooth face 69, 53 to which the buttress 73 abuts. Such shapes include by way of example only, a shape selected from the group consisting of: a tetrahedral prism, a pyramid, a triangular prism, a quadrilateral prism, and a trapezoidal prism. Such shapes may be symmetric or asymmetric.

FIG. 12 is a cross sectional view of a row along the length of a row of teeth. In FIG. 12, each buttress 73 is a different exemplary embodiment of an exemplary buttress. FIG. 12(A) depicts the distal bottom edge 85 not extending to the second tooth face 53 of the adjacent tooth 26. FIG. 12(D) shows the distal bottom edge 85 extending up the second tooth face 53 of the adjacent tooth 26. FIG. 12(E) depicts a first buttress 73 extending from the first face of a first disperser tooth 26 and a second buttress 73 extending from the second face 53 of an adjacent disperser tooth 26.

FIG. 13 is a cross sectional side view that intersects the junction of an exemplary buttresses 73 and the first tooth face 69 to show a cross section of the buttress 73. FIG. 13 better illustrates the abutting area 79 relative to the exposed area 59 of the first tooth face 69. As FIGS. 13(A)-(D) demonstrate, the shape of the buttress 73 may vary greatly provided that the abutting area 79 is less than the total area 55 of the tooth face 69, 52 to which the buttress 73 abuts.

An exemplary plate segment comprises: a substrate having a front side and a back side, wherein the back side is configured to be mounted to a support disc of the disperser, rows of teeth protruding from the front side of the substrate, wherein each of the rows are arranged along an arc extending from one side of the plate segment to an opposite side of the plate segment, in at least one of the rows of teeth, adjacent teeth are joined by a bridge spanning a gap between the adjacent teeth, wherein the bridge is elevated above the front side of the substrate such that the bridge is separated from the front surface by an open space in the gap.

In an exemplary embodiment, the bridge is at or near an end of the adjacent teeth away from the front side of the substrate.

In an exemplary embodiment, the bridge joins a sidewall of each of the adjacent teeth.

In an exemplary embodiment, the bridge joins the sidewalls of the adjacent teeth at an elevation of the teeth above the front side in a range of one-third to an entirety of a height of the adjacent teeth above the front side.

In an exemplary embodiment, the bridge has a shape selected from the group consisting of: a circular or oval shape in cross section at a mid-point of the bridge between the adjacent teeth, a rectangular shape in cross section at a mid-point of the bridge between the adjacent teeth; a tapered shape in cross section at a mid-point of the bridge between the adjacent teeth; and a tear drop shape in cross section at a mid-point of the bridge between the adjacent teeth.

In an exemplary embodiment, the bridge is between each of the adjacent teeth in at least one of the rows.

In an exemplary embodiment, the bridge is a first bridge between the adjacent teeth and the plate segment includes a second bridge between the adjacent teeth, wherein the second bridge is at a different height above the substrate than the first bridge.

In an exemplary embodiment, the bridge is in a radially outermost row and a radially inner row lacks the bridge.

In an exemplary embodiment, the bridge is a first bridge between a first pair of adjacent teeth in the row and the plate segment further comprises a second bridge between a second pair of adjacent teeth in the row, wherein the first bridge is at a different height than the second bridge.

In an exemplary embodiment, the plate segment is configured to turn about a rotational axis, and the plate segment includes an arc-shaped radially inner edge and an arc shaped radially outer edge, and the plate segment has side edges each aligned along a respective radial line.

An exemplary machine comprises: a housing including an inlet configured to receive a stream including cellulosic fibrous material, opposing discs mounted in the housing such that at least one of the discs rotates about a rotational axis within the housing, each of the opposing discs has a front face and the front faces on the opposing discs face each other and are separated by gap between the opposing discs, each of the opposing discs has rows of teeth on the front face for the discs, wherein teeth in each row of teeth are at a common radius from the rotational axis, bridges span gaps between adjacent teeth in at least one of the rows of teeth, wherein the bridges are separated from a substrate of the front face by an open space in the gap, wherein the rows of teeth on the front face of a first of the opposing discs are at different radii than the rows of teeth on the front face of a second of the opposing discs, and wherein the rows of the first opposing disc intermesh with the rows of teeth on the second opposing discs.

In an exemplary embodiment, the first and second opposing discs each include: a support disc mounted to either a shaft or directly to the housing, wherein the support disc includes a mounting substrate, and plate segments mounted to the mounting substrate in an annular array, wherein the front face for the disc is formed by front faces of the plate segments.

An exemplary plate segment comprises: a substrate having a front side and a back side, wherein the back side is configured to be mounted to a support disc of the disperser, rows of teeth protruding from the front side of the substrate, wherein the rows are arranged along an arc extending from a first lateral side of the plate segment to an opposite lateral side of the plate segment, wherein a tooth in the rows of teeth has a first face distally disposed from a second face along a tooth body having a first tooth lateral side and a second tooth lateral side and, wherein a buttress extends from the first face of the tooth to the substrate adjacent to the first face of the tooth.

An exemplary plate segment further comprises a buttress extending from the second face of the tooth to the substrate adjacent the second face of the tooth.

In an exemplary embodiment, the buttress has a height and wherein the height of the buttress is less than the height of the tooth from which the buttress extends.

In an exemplary embodiment, the buttress further comprises an abutting area, wherein the first tooth face further comprises a total area, and wherein the abutting area of the buttress is less than the total area of the first tooth face.

In an exemplary embodiment, a difference between the abutting area and the total area defines an exposed area.

In an exemplary embodiment, the exposed area is in a range of 20% to 80% of the total area of the first tooth face.

In an exemplary embodiment, the buttress has a shape selected from the group consisting of: a tetrahedral prism, a pyramid, a triangular prism, a quadrilateral prism, and a trapezoidal prism.

In an exemplary embodiment, the tooth further comprises a flat surface disposed at the top of the tooth among the first tooth face, the second tooth face, the first lateral two side, and the second lateral tooth side.

In an exemplary embodiment, the buttress further comprises a base disposed on the substrate adjacent to the first face of the tooth, wherein the base has a width, and where the base width is wider than a width at a top edge of the buttress.

In an exemplary embodiment, the buttress further comprises a hypotenuse extending from a top edge of the buttress to a distal bottom edge of the buttress.

In an exemplary embodiment, the distal bottom edge adjoins a second tooth face of an adjacent tooth.

While the invention has been described in connection with what is presently considered the most practical and preferred embodiment, it is to be understood that the invention is not to be limited to the disclosed embodiment, but on the contrary, is intended to cover various modifications and equivalent arrangements included within the spirit and scope of the invention.

What is claimed is:

1. A plate segment comprising:
   a substrate having a front side and a back side, wherein the back side is configured to be mounted to a support disc of a disperser; and
   rows of teeth protruding from the front side of the substrate, wherein the rows of teeth are arranged along an arc extending from a first lateral side of the plate segment to an opposite lateral side of the plate segment, wherein a tooth in the rows of teeth has a first face distally disposed from a second face along a tooth body having a first tooth lateral side and a second tooth lateral side, and wherein a buttress extends from the first face of the tooth only to the substrate adjacent to the first face of the tooth or in an inclined direction to the second face of an adjacent tooth from the first face of the tooth to the substrate adjacent to the first face of the tooth.

2. The plate segment of claim 1 further comprising a buttress extending in a direction toward a face of a second adjacent tooth from the second face of the tooth to the substrate adjacent the second face of the tooth.

3. The plate segment of claim 1, wherein the buttress has a height and wherein the height of the buttress is less than the height of the tooth from which the buttress extends.

4. The plate segment of claim 1, wherein the buttress further comprises an abutting area, wherein the first tooth face further comprises a total area, and wherein the abutting area of the buttress is less than the total area of the first tooth face.

5. The plate segment of claim 4, wherein a difference between the abutting area and the total area defines an exposed area.

6. The plate segment of claim 5, wherein the exposed area is in a range of 20% to 80% of the total area of the first tooth face.

7. The plate segment of claim 1, wherein the buttress has a shape selected from the group consisting of: a tetrahedral prism, a pyramid, a triangular prism, a quadrilateral prism, and a trapezoidal prism.

8. The plate segment of claim 1, wherein the tooth further comprises a flat surface disposed at a top of the tooth among the first tooth face, the second tooth face, the first tooth lateral side, and the second tooth lateral tooth side.

9. The plate segment of claim 1, wherein the buttress further comprises a base disposed on the substrate adjacent to the first face of the tooth, wherein the base has a width, and where a base width is wider than a width at a top edge of the buttress.

10. The plate segment of claim 1, wherein the buttress further comprises a hypotenuse extending from a top edge of the buttress to a distal bottom edge of the buttress.

11. The plate segment of claim 10, wherein the distal bottom edge adjoins a second tooth face of an adjacent tooth.

12. The plate segment of claim 1, wherein the plate segment is configured to turn about a rotational axis, and the plate segment includes an arc-shaped radially inner edge and an arc shaped radially outer edge, and the plate segment has side edges each aligned along a respective radial line.

* * * * *